United States Patent [19]

Villanueva

[11] Patent Number: 4,633,581

[45] Date of Patent: Jan. 6, 1987

[54] INSTALLATION FOR PALLETISING FLAT PIECES

[76] Inventor: Eliseo H. Villanueva, C/Cid, s/n.-Polígono Industrial Torrubero, Museros (Valencia), Spain

[21] Appl. No.: 665,013

[22] Filed: Oct. 26, 1984

[30] Foreign Application Priority Data

Apr. 27, 1984 [ES] Spain ................................ 279.083

[51] Int. Cl.[4] ................... B23P 19/00; B65G 57/081; B65G 47/24
[52] U.S. Cl. .................................. 29/822; 414/55; 198/419
[58] Field of Search ................ 29/822; 414/29, 33, 414/50, 53, 55, 56, 70–72; 193/37; 198/360, 402, 403, 418, 419, 421, 426, 432

[56] References Cited

U.S. PATENT DOCUMENTS

| Re. 28,160 | 9/1974 | Lingl | 414/56 |
|---|---|---|---|
| 3,034,632 | 5/1962 | Wampler | 414/55 |
| 3,608,746 | 9/1971 | Meyer | 414/34 |
| 3,810,554 | 5/1974 | London et al. | 414/53 |
| 4,079,843 | 3/1978 | Fischer et al. | 414/70 |
| 4,151,906 | 5/1979 | Pheiffer et al. | 198/421 |
| 4,316,693 | 2/1982 | Baxter et al. | 414/71 |
| 4,326,439 | 4/1982 | Frost et al. | 198/419 |

Primary Examiner—Mark Rosenbaum
Assistant Examiner—Steven Nichols
Attorney, Agent, or Firm—McGlew and Tuttle

[57] ABSTRACT

The pieces to be palletized are conveyed by a roller table to bar elements which reciprocally turn the pieces so that they face each other. Grippers then grip the facing pieces which originally lie flat, so as to move them into a vertical parallel position on a conveyor belt. An upper conveyor belt engages the top of the vertical parallel pieces to hold them in correct orientation. An automatic strapping mechanism them applies this strap around the pieces. A roller table is provided for lateral movement of the strapped packages. The roller table which initially receives the pieces pass in a horizontal flat position on the roller table. A section of the roller table has portions of its rollers removed so that under-sized pieces fall through the opening thus formed. Only pieces with correct size, that is, unbroken pieces, are conveyed along the parallel passages of the roller table.

2 Claims, 2 Drawing Figures

INSTALLATION FOR PALLETISING FLAT PIECES

FIELD AND BACKGROUND OF THE INVENTION

The present invention refers to an installation for palletising flat pieces.

Essentially the installation is comprised of a plurality of synchronized linked mechanisms, moved as a whole or independently, permitting the orderly and selective packaging of all kinds of flat pieces without any hand labor, with the exception of the starting, maintenance, follow up and control operations.

It is clear that the advantages resulting from the use of this installation reside in the reduction of hand labor, with the elimination of all necessary personnel, achieving in an average or long term way, a saving in time and a reduction in the packaging expenses.

SUMMARY OF THE INVENTION

These synchronized mechanisms to which reference is made are constituted of a roller conveyor table, two selectors of broken pieces, two reciprocating turning devices, two compact devices, a lateral conveyor, a vertical positioner, an automatic strapping machine, and a crane having a hydraulic clamp.

The pieces deposited manually or mechanically on the roller table are moved towards two parallel passages having a width similar to that of the piece, along which they slide until they reach a sector for each passage from which the rollers have been removed and limited to a small lateral extension on which the edges of the pieces rest, the other part thereof not being supported at its central zone, consequently producing, in the case of faulty pieces, the total breakage and subsequent fall thereof along the central hollow space.

Behind this selection zone, the remaining pieces continue moving along the corresponding passage on conveyor belts, until they reach turning rods activated alternatively each two pieces, so that thereafter a pair of grips superimpose them two by two, wherefore the surfaces having an identical constitution are faced.

Then one of the passages continues as a roller train, while the other incorporates a lateral actuator conveyor which deposits the pieces on the roller train into which the first passage continues.

The installation continues with a single passage which is provided with a vertical positioning device of the pieces, transferring them to an automatic strapping machine which, after packing them, deposits them completely on a roller train provided with a bridge from which an automatic crane, having a laterally displaceable hydraulic clamp hangs, and which collects the strapped packages in a scheduled manner to deposit them on the carriage disposed below the bridge in a lateral position to the roller train.

For a better understanding of the described installation for palletising flat pieces, a set of drawings is attached to this specification, wherein:

FIG. 1 is a perspective view of the inventive, with the exception of the bridge and the automatic crane; and FIG. 2 is another perspective view, showing the bridge and the crane which face the remainder of the installation in a coupling position.

DESCRIPTION OF THE PREFERRED EMBODIMENT

Figure 1:
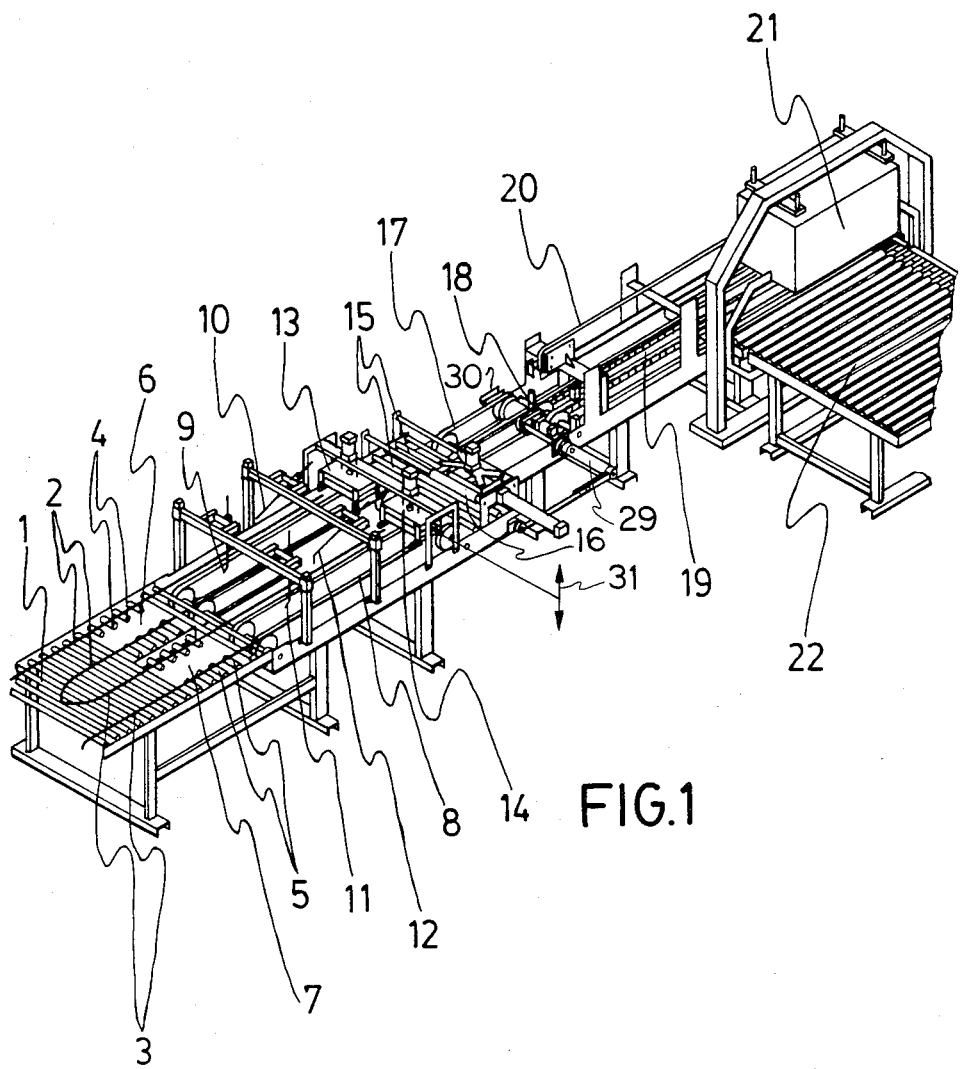

With reference to the mentioned figures, the installation for palletising flat pieces of this invention will now be described in detail. Thus, the installation, following the movement of the pieces, is initiated with a roller table 1 (FIG. 1) on the surface of which there have been disposed crossbars 2 and 3 forming two parallel passages along which the pieces slide, to encounter sectors not provided in the center with the rollers 1 to form small lateral roller sectors 4 and 5 on which the sides of the pieces rest, to permit all the faulty pieces to drop through this central space 6 and 7.

The pieces then pass to conveyor belts 8 which will pull them beneath two bridges from which sets of bars 9, 10, 11 and 12 hang, which turn the pieces reciprocally in pairs to turn alternate pieces upside down and to continue their movement towards two sets of grips 13 and 14 which serve to form pairs of pieces which face each other.

Then one of the passages continue as a roller train 15 while a lateral conveyor 16 is mounted on the other passage, which conveyor pulls the superimposed pieces towards the roller train 15 of the first passage along which the pieces continue their movement aligned in a single row, on a conveyor belt 17 to a vertical positioning device 18.

This vertical position of the pieces in this sector is achieved by two parallel bands 19 and 20 which send them to an automatic strapping machine 21 which, after trying them, deposits them on a roller train 22.

Figure 2:
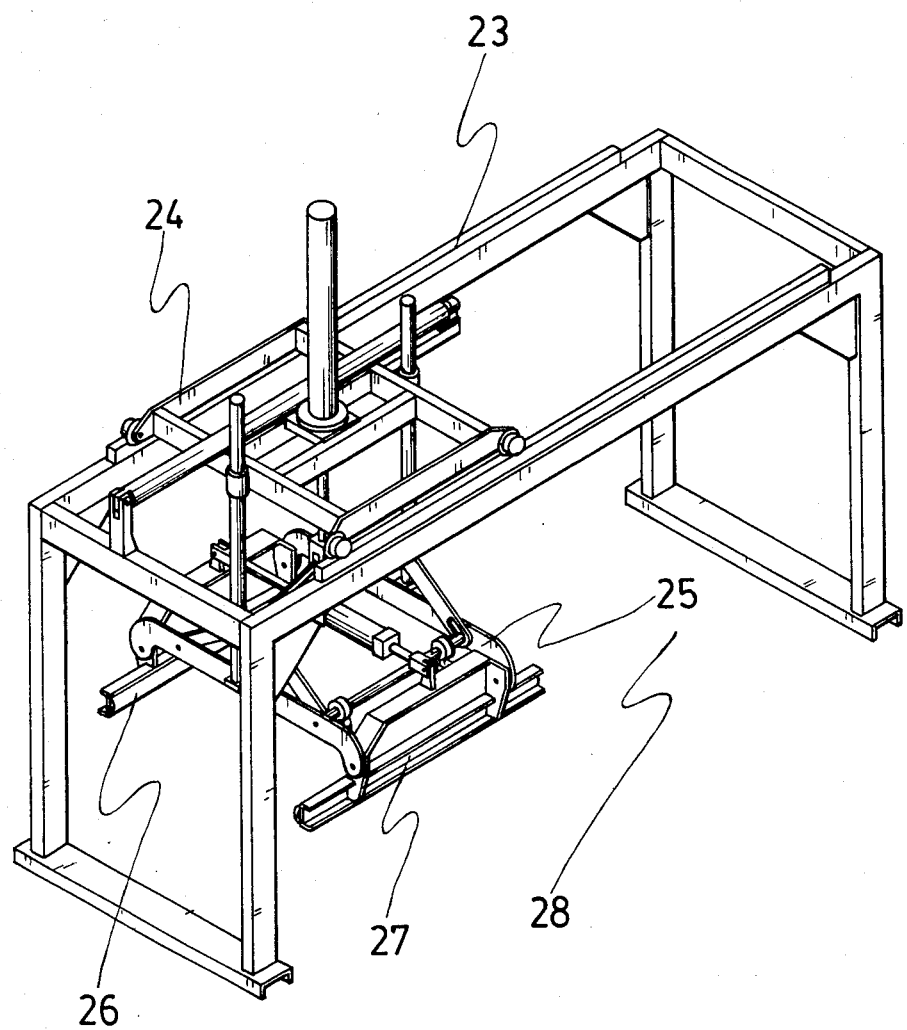

A bridge 23 (FIG. 2) is disposed on this roller train, along which bridge a carriage 24 secured to hydraulic clamp 25, slides. The clamp 25 provides the contacting zone with the protected pieces 26 and 27, said clamp serving to collect the packages of pieces and by means of a lateral movement of carriage 24 on bridge 23, conveys them to a carriage space 28 which is disposed below the bridge 23 and off the roller table 22.

Turning now to the functioning of parts of the invention in greater detail, grips 13 and 14 serve to form pairs of pieces that face each other. This is carried out because these grips are mounted for movement in a descending and ascending direction 31, in such a manner that when a flat piece approaches one of the grips, while moving on belts 8, that grip is lowered. At the end of its downward travel, its jaws 33 are closed. The grip is then raised along with the flat piece. When the follwing piece approaches, the set of grip, along wit the flat piece is again lowered and while travelling the jaws are opened to deposit the piece onto that which had later approached. The two pieces thus form a pair with their faces close together and they continue their movement through the roller train 15 and conveyor 17 towards the vertical positioning device 18.

Simultaneously, the tiles approaching from the other passage effect the cycle in the same manner, to form the pairs and once formed pass to the roller train 15 where there is provided the lateral conveyor or carriage 16 which displaces the received pair laterally to the line of the former passage, wherefrom it continues along the conveyor 17 to the vertical position device 18.

Vertical positioning device 8 has grips 30 which are mounted on an assembly with rotational crank 29 which raises grips 30 to pass the pieces from the horizontal position to the vertical position and depositing them onto the space between conveyor bands 19 and 20, where they are grouped to form a package having the desired amount of pieces.

To avoid one piece from damaging the other when passing to the vertical position, and when they are at this position, device 18 has another set of grips mounted on a carriage which gently approaches the received pieces to those already placed on band 19. The conveyor is operated to leave a free space for the following pair of pieces.

I claim:

1. An installation for palletizing flat pieces, comprising:

a first roller table for conveying flat pieces in a horizontal position and in a feed direction;

passage forming means over said first roller table for defining two parallel passages extending in the feed direction for guiding flat pieces in a horizontal position on the first roller table and in two parallel rows;

said first roller table having a central opening in each of said two passages whereat pieces in a horizontal position are supported only at their edges parallel to said feed direction so that defectives pieces fall through said central opening;

turning means positioned over each parallel passage downstream of said central opening in said feed direction for turning alternate flat pieces in each row of flat pieces into an upside down horizontal position;

grip means over each of said parallel passages downstream of said turning means for gripping and raising alternate ones of the flat pieces in each row and for placing each alternate piece on a following piece moving in said feed direction to form facing pairs of pieces lying in a horizontal position on said passages;

lateral conveyor means positioned over one of said passages downstream of said grip means for engaging each facing pair of pieces on said one passage, for lifting each pair of facing pieces and for transferring each pair of facing pieces over the other of said passages and further for depositing each pair of pieces from said one passage onto a pair of pieces on said other passage;

further conveyor means extending in said feed direction from said other passage and positioned downstream of said lateral conveyor means for conveying superimposed facing pairs of pieces from said other pasage further along said feed direction;

vertical positioning means downstream of said further conveyor means for moving each of said superiposed facing pairs of pieces from a horizontal position to a vertical position;

upper and lower conveyor belts positioned downstream of said vertical positioning means for engaging upper and lower edges of said vertically positioned superimposed facing pairs of pieces and for conveying them further along said feed direction; and strapping means downstream of said upper and lower conveyor belts for placing the strap around each superimposed facing pairs of pieces.

2. An installation according to claim 1, including a second roller table positioned downstream of said upper and lower belts for moving each strapped superimposed facing pairs of pieces laterally of said feed direction, a bridge over said second roller table, an automatic crane with a clamp movable on said bridge over said second roller table for engaging the strapped pieces lifting them from said second roller table and moving them away from said second roller table.

* * * * *